US010364727B2

(12) United States Patent
Matsumoto

(10) Patent No.: US 10,364,727 B2
(45) Date of Patent: Jul. 30, 2019

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Arifumi Matsumoto, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/852,080

(22) Filed: Dec. 22, 2017

(65) Prior Publication Data

US 2018/0179936 A1 Jun. 28, 2018

(30) Foreign Application Priority Data

Dec. 27, 2016 (JP) ................. 2016-252645

(51) Int. Cl.
*F01N 3/20* (2006.01)
*F01N 11/00* (2006.01)

(52) U.S. Cl.
CPC .......... *F01N 3/208* (2013.01); *F01N 3/2066* (2013.01); *F01N 3/2073* (2013.01); *F01N 11/002* (2013.01); *F01N 2550/02* (2013.01); *F01N 2560/025* (2013.01); *F01N 2570/14* (2013.01); *F01N 2610/02* (2013.01); *F01N 2900/1402* (2013.01); *F01N 2900/1602* (2013.01); *Y02T 10/24* (2013.01); *Y02T 10/47* (2013.01)

(58) Field of Classification Search
CPC ........ F01N 3/206; F01N 3/208; F01N 3/2066; F01N 2610/02; F01N 2560/025; F01N 2900/1602
See application file for complete search history.

(56) References Cited

U.S. PATENT DOCUMENTS

| | | | |
|---|---|---|---|
| 2010/0107606 A1* | 5/2010 | Narayanaswamy | B01D 53/9418 60/274 |
| 2011/0023591 A1* | 2/2011 | Dobson | F01N 3/106 73/114.75 |
| 2012/0023905 A1* | 2/2012 | Yezerets | F01N 3/208 60/274 |
| 2015/0275730 A1* | 10/2015 | Gupta | F01N 3/208 60/274 |
| 2016/0258373 A1* | 9/2016 | Tanaka | F01N 3/0814 |
| 2018/0179935 A1 | 6/2018 | Matsumoto | |

FOREIGN PATENT DOCUMENTS

| | | |
|---|---|---|
| JP | 2009-293605 | 12/2009 |
| JP | 2018-105233 A | 7/2018 |

* cited by examiner

*Primary Examiner* — Jonathan R Matthias
(74) *Attorney, Agent, or Firm* — Finnegan, Henderson, Farabow, Garrett & Dunner, LLP

(57) ABSTRACT

A reducing agent is supplied to an NOx catalyst in a suitable manner, while suppressing NOx from being produced by oxidation of ammonia in the NOx catalyst. In cases where the temperature of NOx is equal to or higher than a predetermined temperature at which ammonia is oxidized, an amount of ammonia or an amount of a precursor thereof to be added into exhaust gas from an addition valve is made smaller, when an air fuel ratio of exhaust gas flowing into the NOx catalyst is larger than a predetermined air fuel ratio, than when the air fuel ratio of the exhaust gas is equal to or less than the predetermined air fuel ratio.

2 Claims, 11 Drawing Sheets

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2016-252645 filed on Dec. 27, 2016 the entire contents of which are incorporated by reference herein.

TECHNICAL FIELD

The present disclosure relates to an exhaust gas purification apparatus for an internal combustion engine.

DESCRIPTION OF THE RELATED ART

There has been known an NOx selective catalytic reduction catalyst (hereinafter, also referred to simply as an "NOx catalyst") which purifies (removes or reduces) NOx contained in an exhaust gas from an internal combustion engine by using ammonia as a reducing agent. At the upstream side of this NOx catalyst, there is arranged an addition valve or the like which serves to add ammonia or a precursor of ammonia (hereinafter, ammonia or a precursor thereof being also referred to as an "additive agent") into the exhaust gas. As the precursor of ammonia, there can be mentioned urea, for example.

Here, in cases where the temperature of the exhaust gas is high, ammonia can be oxidized to produce NOx. When ammonia decreases due to the oxidation of ammonia, ammonia runs short in the NOx catalyst, so it can become difficult to remove or reduce NOx. For that reason, there is known a technology in which in cases where the temperature of the exhaust gas is high, the degree of oxidation of ammonia is calculated based on the temperature of the exhaust gas and the flow rate of the exhaust gas, and the amount of addition of urea is made to increase, as this degree of oxidation is large (for example, refer to patent literature 1).

CITATION LIST

Patent Literature

Patent Literature 1: Japanese Patent Application Laid-Open Publication No. 2009-293605

SUMMARY

Technical Problem

Here, in cases where the temperature of the NOx catalyst is high, ammonia can be oxidized to produce NOx in the NOx catalyst. Accordingly, as in the past, in cases where the temperature of the exhaust gas is high, when the amount of addition of urea is made to increase as the degree of oxidation of ammonia is larger, the amount of ammonia to be oxidized in the NOx catalyst can also increase. Then, when a large amount of NOx is produced in the NOx catalyst, the amount of NOx flowing out of the NOx catalyst will increase.

Accordingly, the present disclosure has for its object to supply a reducing agent to an NOx catalyst in a suitable manner, while suppressing NOx from being produced by oxidation of ammonia in the NOx catalyst.

Solution to Problem

In order to solves the above-mentioned problems, an exhaust gas purification apparatus for an internal combustion engine according to the present disclosure comprises: an NOx selective catalytic reduction catalyst that is arranged in an exhaust passage of the internal combustion engine and selectively reduces NOx in an exhaust gas by using ammonia as a reducing agent; an addition valve that is arranged in said exhaust passage at the upstream side of said NOx selective catalytic reduction catalyst and adds an additive agent, which is ammonia or a precursor of ammonia, into the exhaust gas; a temperature sensor configured to acquire a temperature of said NOx selective catalytic reduction catalyst; an air fuel ratio sensor configured to acquire an air fuel ratio of the exhaust gas flowing into said NOx selective catalytic reduction catalyst; and a controller configured to make an amount of the additive agent to be added into the exhaust gas from said addition valve smaller when the air fuel ratio acquired by said air fuel ratio sensor is larger than a predetermined air fuel ratio, than when it is equal to or less than said predetermined air fuel ratio, in cases where the temperature acquired by said temperature sensor is equal to or higher than a predetermined temperature at which ammonia is oxidized.

Here, when the air fuel ratio of the exhaust gas is equal to or less than the predetermined air fuel ratio even though in cases where the temperature of the NOx catalyst is equal to or higher than the predetermined temperature, the oxidation of ammonia in the NOx catalyst is suppressed. Here, note that the predetermined air fuel ratio is an air fuel ratio at which the ratio of ammonia to be oxidized with respect to the ammonia supplied to the NOx catalyst falls within an allowable range, in the case where the temperature of the NOx catalyst is equal to or higher than the predetermined temperature. That is, in cases where the temperature of the NOx catalyst is equal to or higher than the predetermined temperature and the air fuel ratio of the exhaust gas is larger than the predetermined air fuel ratio, the oxidation of ammonia in the NOx catalyst can be suppressed, by making the amount of addition of the additive agent relatively small. Thus, when the air fuel ratio of the exhaust gas is larger than the predetermined air fuel ratio, the outflow of NOx from the NOx catalyst can be suppressed by suppressing the oxidation of ammonia in the NOx catalyst. Here, note that when the air fuel ratio of the exhaust gas flowing into the NOx catalyst is larger than the predetermined air fuel ratio, the amount of the additive agent to be added into the exhaust gas from the addition valve may also be made smaller as the air fuel ratio of the exhaust gas is larger. In this case, the amount of the additive agent may be changed in a stepwise manner, or may be changed continuously. In addition, in cases where the temperature of the NOx catalyst is equal to or higher than the predetermined temperature at which ammonia is oxidized, when the air fuel ratio of the exhaust gas is larger than the predetermined air fuel ratio, the amount of the additive agent to be added into the exhaust gas from the addition valve may be made zero. That is, making the amount of the additive agent small can also include making the amount of the additive agent zero.

In addition, said NOx selective catalytic reduction catalyst can be configured by including a first NOx catalyst and a second NOx catalyst that is arranged in said exhaust passage at the downstream side of said first NOx catalyst. Said temperature sensor can be configured so as to acquire the temperature of said first NOx catalyst, and said air fuel ratio sensor can be configured to acquire the air fuel ratio of the exhaust gas flowing into said first NOx catalyst. Said addition valve can be configured as a first addition valve that is arranged in said exhaust passage at the upstream side of said first NOx catalyst, and provision can be further made for a second addition valve that is arranged in said exhaust passage at the downstream side of said first NOx catalyst and at the upstream side of said second NOx catalyst, and adds the additive agent into the exhaust gas. In the case where the temperature of said first NOx catalyst acquired by said temperature sensor is equal to or higher than said predetermined temperature, said controller can make a ratio of an amount of the additive agent to be added from said first addition valve with respect to a total amount of the additive agents to be added from said first addition valve and said second addition valve smaller when the air fuel ratio acquired by said air fuel ratio sensor is larger than said predetermined air fuel ratio than when the air fuel ratio acquired by said air fuel ratio sensor is equal to or less than said predetermined air fuel ratio.

Here, because the first NOx catalyst is arranged in the exhaust passage at the upstream side of the second NOx catalyst, the temperature of the first NOx catalyst is apt to become higher than the temperature of the second NOx catalyst. Accordingly, even in cases where the first NOx catalyst reaches a temperature at which ammonia is oxidized, the second NOx catalyst may not reach the temperature at which ammonia is oxidized. In such a case, by supplying the additive agent to the second NOx catalyst, NOx can be reduced in said second NOx catalyst. Then, if an amount of the additive agent excessive for the first NOx catalyst is supplied thereto from the first addition valve so that the additive agent may pass through the first NOx catalyst, the additive agent can be supplied to the second NOx catalyst. However, when the air fuel ratio of the exhaust gas is larger than the predetermined air fuel ratio, ammonia will be oxidized in the first NOx catalyst. In contrast to this, when the air fuel ratio of the exhaust gas is larger than the predetermined air fuel ratio, by decreasing the amount of the additive agent to be added from the first addition valve and increasing, by an amount thus decreased, the amount of the additive agent to be added from the second addition valve, the additive agent can be supplied to the second NOx catalyst, and the oxidation of ammonia in the first NOx catalyst can be suppressed. Here, note that in cases where the temperature of the first NOx catalyst is equal to or higher than the predetermined temperature, when the air fuel ratio of the exhaust gas flowing into the first NOx catalyst is larger than the predetermined air fuel ratio, the controller may make zero the amount of the additive agent to be added into the exhaust gas from the first addition valve. That is, making smaller the ratio of the amount of the additive agent to be added from the first addition valve with respect to the above-mentioned total amount of the additive agents can also include making zero this ratio of the amounts of the additive agents.

Advantageous Effects

According to the present disclosure, a reducing agent can be supplied to an NOx catalyst in a suitable manner, while suppressing NOx from being produced by oxidation of ammonia in the NOx catalyst.

DESCRIPTION OF THE EMBODIMENTS

Hereinafter, the modes for carrying out the present disclosure will be exemplarily described in detail based on embodiments with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
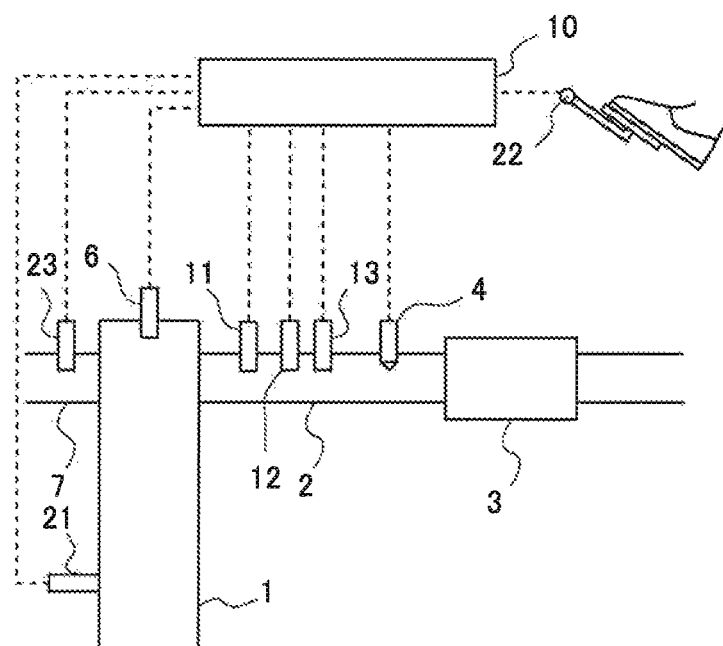
FIG. 1 is a view showing the schematic construction of an internal combustion engine and its exhaust system according to a first embodiment of the present disclosure.

FIG. 1 is a view showing the schematic construction of an internal combustion engine and its exhaust system according to this embodiment of the present disclosure. The internal combustion engine 1 is a diesel engine for driving a vehicle. However, the internal combustion engine 1 may be a gasoline engine. An exhaust passage 2 is connected to the internal combustion engine 1. In the exhaust passage 2, there is arranged an NOx selective catalytic reduction catalyst 3 (hereinafter, referred to as an "NOx catalyst 3") which serves to selectively reduce NOx in an exhaust gas with the use of ammonia as a reducing agent.

In the exhaust passage 2 at the upstream side of the NOx catalyst 3, there is arranged an addition valve 4 which serves to add urea water as a precursor of ammonia into an exhaust gas. The urea water added from the addition valve 4 is hydrolyzed into ammonia in the NOx catalyst 3, and the ammonia thus generated is adsorbed to the NOx catalyst 3. This ammonia is used as the reducing agent in the NOx catalyst 3. Here, note that the addition valve 4 may add ammonia in place of the urea water. Hereinafter, the precursor of ammonia and ammonia are each referred to as the "reducing agent".

Further, in the exhaust passage 2 at the upstream side of the addition valve 4, there are arranged an NOx sensor 11 that detects the concentration of NOx in the exhaust gas flowing into the NOx catalyst 3, an air fuel ratio sensor 12 that detects the air fuel ratio of the exhaust gas flowing into the NOx catalyst 3, and a temperature sensor 13 that detects the temperature of the exhaust gas flowing into the NOx catalyst 3. Here, note that in this embodiment, the temperature sensor 13 corresponds to a temperature sensor in the present disclosure, and the air fuel ratio sensor 12 corresponds to an air fuel ratio sensor in the present disclosure. On the internal combustion engine 1, there are mounted fuel injection valves 6 (though only one is shown) for injecting fuel into individual cylinders, respectively.

In addition, an intake passage 7 is connected to the internal combustion engine 1. An air flow meter 23 for detecting the amount of intake air in the internal combustion engine 1 is arranged in the intake passage 7.

Then, an ECU 10, which is an electronic control unit, is provided as a controller in combination with the internal combustion engine 1. The ECU 10 controls the internal combustion engine 1, an exhaust gas purification apparatus, and so on. A crank position sensor 21 and an accelerator opening sensor 22, in addition to the NOx sensor 11, the air fuel ratio sensor 12, the temperature sensor 13, and the air flow meter 23 as mentioned above, are electrically connected to the ECU 10, so that the detected values of these individual sensors are passed or transmitted to the ECU 10.

The ECU 10 is able to grasp the operating state of the internal combustion engine 1, such as the engine rotational speed based on the detection of the crank position sensor 21, the engine load based on the detection of the accelerator opening sensor 22, etc. Here, note that in this embodiment, the NOx in the exhaust gas flowing into the NOx catalyst 3 is able to be detected by the NOx sensor 11, but the NOx contained in the exhaust gas discharged from the internal combustion engine 1 (the exhaust gas before being purified or reduced in the NOx catalyst 3, i.e., the exhaust gas flowing into the NOx catalyst 3) has relation with the operating state of the internal combustion engine 1, and hence, is also able to be estimated based on the above-mentioned operating state of the internal combustion engine 1. In addition, the ECU 10 is able to estimate the temperature of the NOx catalyst 3 based on the temperature of the exhaust gas detected by the temperature sensor 13. In addition, the temperature sensor 13 may be a sensor that detects the temperature of the NOx catalyst 3, in place of the temperature of the exhaust gas. Also, note that the temperature of the NOx catalyst 3 has relation to the operating state of the internal combustion engine 1, so it is also possible to estimate the temperature of the NOx catalyst 3 based on the above-mentioned operating state of the internal combustion engine 1. Moreover, the ECU 10 can calculate the flow rate of the exhaust gas based on the detected value of the air flow meter 23 and the amount of fuel injection from each of the fuel injection valves 6. On the other hand, the addition valve 4 and the fuel injection valve 6 are connected to the ECU 10 through electrical wiring, so that the addition valve 4 and the fuel injection valves 6 are controlled by the ECU 10.

The ECU 10 adds an additive agent from the addition valve 4 by using either of the following two kinds of methods. A first method of adding the additive agent is a method of detecting or estimating the amount of NOx flowing into the NOx catalyst 3, and adding an amount of additive agent corresponding to the amount of NOx thus detected or estimated. The control of adding the additive agent according to this first method is hereinafter referred to as equivalent ratio control. The equivalent ratio referred to herein is the ratio of the amount of the additive agent to be added from the addition valve 4 with respect to the amount of additive agent able to reduce the NOx flowing into the NOx catalyst 3 without excess and deficiency. Here, note that in cases where the equivalent ratio will be referred to below, it is assumed to indicate this equivalent ratio. The equivalent ratio control is carried out without regard to the amount of adsorption of ammonia in the NOx catalyst 3. In this embodiment, the equivalent ratio control is carried out, when the temperature of the NOx catalyst 3 is relatively high.

For example, in cases where a filter for trapping particulate matter (PM) is arranged in the exhaust passage 2 at the upstream side of the NOx catalyst 3, regeneration processing of the filter, which is processing for raising the temperature of the filter, is carried out in order to oxidize the PM trapped in the filter. At this time, the temperature of the NOx catalyst 3 goes up. Here, when the temperature of the NOx catalyst 3 becomes high, the amount of ammonia which can be adsorbed in the NOx catalyst 3 decreases, so when the regeneration processing of the filter is carried out, the amount of adsorption of ammonia in the NOx catalyst 3 is decreased. In addition, for example, in cases where an NOx storage reduction catalyst is arranged in the exhaust passage 2 at the upstream side of the NOx catalyst 3, sulfur recovery processing for recovering sulfur poisoning of the NOx storage reduction catalyst is carried out. At this time, the temperature of the NOx storage reduction catalyst is caused to rise, so the temperature of the NOx catalyst 3 also goes up, and the amount of adsorption of ammonia in the NOx catalyst 3 is decreased. Moreover, at the time of the high load operation of the internal combustion engine 1, exhaust gas of high temperature is discharged from the internal combustion engine 1, so the temperature of the NOx catalyst 3 goes up. For that reason, the amount of adsorption of ammonia in the NOx catalyst 3 is decreased. Thus, when the temperature of the NOx catalyst 3 becomes relatively high, it becomes difficult to make a sufficient amount of ammonia adsorbed in the NOx catalyst 3 in advance, and hence, the equivalent ratio control is carried out in which the additive agent is added according to the amount of NOx flowing into the NOx catalyst 3.

A second method of adding the additive agent is a method in which ammonia has been made to adsorb to the NOx catalyst 3 in advance in a range where an amount of saturated adsorption is not exceeded, and in which in cases where the ammonia adsorbed to the NOx catalyst 3 is decreased by the reduction of NOx, etc., an amount of additive agent corresponding to a decreased amount of ammonia is supplied. The control of adding the additive agent according to this second method is hereinafter referred to as adsorption amount control. This adsorption amount control is carried out based on the amount of adsorption of ammonia in the NOx catalyst 3. In this embodiment, the adsorption amount control is carried out, when the temperature of the NOx catalyst 3 is relatively low.

In the adsorption control, the ECU 10 adds the additive agent from the addition valve 4 in such a manner that the amount of adsorption of ammonia in the NOx catalyst 3 becomes a target value of the amount of adsorption of ammonia in the NOx catalyst 3 (hereinafter, also referred to as a target amount of adsorption). In this case, the ECU 10 calculates an amount of additive agent to be added from the addition valve 4 so as to make the amount of adsorption of ammonia in the NOx catalyst 3 equal to the target amount of adsorption, by compensating for an amount of ammonia which has been consumed in order to reduce NOx in the NOx catalyst 3 (hereinafter, also referred to as an amount of ammonia consumption), and an amount of ammonia which has been desorbed from the NOx catalyst 3 and decreased without reducing NOx (hereinafter, also referred to as an amount of desorption of ammonia), in a period of time from a starting point in time of the last supply of the additive agent until a starting point in time of the current supply of the additive agent. The amount of ammonia consumption is calculated based on the amount of NOx flowing into the NOx catalyst 3, the temperature of the NOx catalyst 3, and the target amount of adsorption in the NOx catalyst 3. The amount of desorption of ammonia is calculated based on the temperature of the NOx catalyst 3 and the target amount of adsorption in the NOx catalyst 3. Then, an amount of the additive agent corresponding to a total amount of the amount of ammonia consumption and the amount of desorption of ammonia is added from the addition valve 4.

Figure 2:
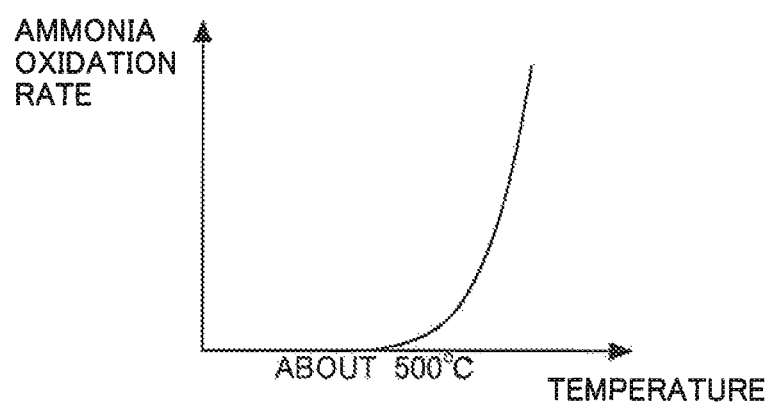
FIG. 2 is a view showing the relation between the temperature of an NOx catalyst and the rate of oxidation of ammonia.

Here, note that in this embodiment, in cases where the temperature of the NOx catalyst 3 is lower than the predetermined temperature, the adsorption amount control is carried out by the ECU 10, whereas in cases where the temperature of the NOx catalyst 3 is equal to or higher than the predetermined temperature, the equivalent ratio control is carried out by the ECU 10. The predetermined temperature referred to herein is a temperature (e.g., 500 degrees C.) at which the rate of oxidation of ammonia begins to increase when a sufficient amount of oxygen is contained in the exhaust gas. Here, FIG. 2 is a view showing the relation between the temperature of the NOx catalyst 3 and the rate of oxidation of ammonia. Because the oxidation of ammonia hardly takes place in cases where the temperature of the NOx catalyst 3 is lower than the predetermined temperature, the predetermined temperature may also be a temperature at which ammonia is oxidized (or a temperature at which the oxidation of ammonia begins), or a temperature at which the rate of oxidation of ammonia becomes equal to or more than the predetermined rate. When the temperature of the NOx catalyst 3 becomes equal to or higher than the predetermined temperature, the rate of oxidation of ammonia becomes large with the rise of the temperature. This predetermined temperature changes according to the kind of NOx catalyst 3, and can be obtained in advance through experiments, simulations, or the like.

Here, when the temperature of the NOx catalyst 3 becomes equal to or higher than the predetermined temperature, ammonia can be oxidized to produce NOx in the NOx catalyst 3. At this time, the higher the oxygen concentration of the exhaust gas, the more easily ammonia is oxidized. Accordingly, when the additive agent is added from the addition valve 4 in cases where the temperature of the NOx catalyst 3 is equal to or higher than the predetermined temperature and the oxygen concentration of the exhaust gas is high, ammonia can be oxidized to produce NOx in the NOx catalyst 3. On the other hand, if the oxygen concentration of the exhaust gas is low even though the temperature of the NOx catalyst 3 is equal to or higher than the predetermined temperature, when the additive agent is added from the addition valve 4, ammonia can be suppressed from being oxidized in the NOx catalyst 3.

Accordingly, in this embodiment, in cases where the temperature of the NOx catalyst 3 is equal to or higher than the predetermined temperature, the equivalent ratio control is carried out so that the amount of the additive agent added from the addition valve 4 may become smaller, when the air fuel ratio of the exhaust gas flowing into the NOx catalyst 3 is larger than a predetermined air fuel ratio, than when it is equal to or less than the predetermined air fuel ratio. That is, by making the amount of addition of the additive agent smaller when in a state where ammonia is easily oxidized, ammonia is suppressed from being oxidized. Here, note that the predetermined air fuel ratio is an air fuel ratio at which the ratio of ammonia to be oxidized with respect to the ammonia supplied to the NOx catalyst 3 falls within an allowable range, in the case where the temperature of the NOx catalyst 3 is equal to or higher than the predetermined temperature. This predetermined air fuel ratio can be obtained in advance through experiments, simulations, or the like. In addition, in cases where the temperature of the NOx catalyst 3 is equal to or higher than the predetermined temperature, when the air fuel ratio of the exhaust gas flowing into the NOx catalyst 3 is larger than the predetermined air fuel ratio, the additive agent from the addition valve 4 may not be added (the amount of addition of the additive agent from the addition valve 4 may be decreased to 0).

Figure 3:
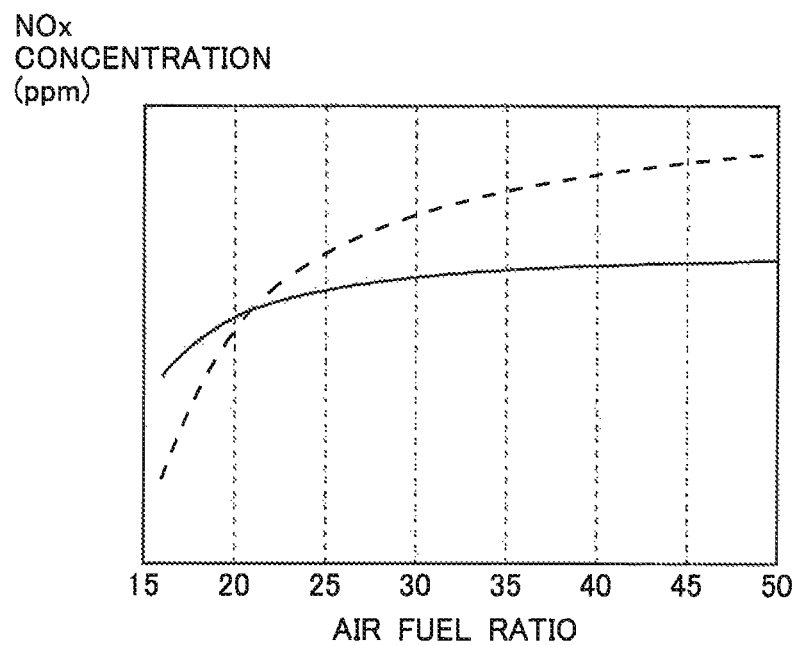
FIG. 3 is a view showing the relation between the air fuel ratio of exhaust gas flowing into the NOx catalyst and the concentration of NOx flowing out from the NOx catalyst, in cases where the temperature of the NOx catalyst is equal to or higher than a predetermined temperature.

Here, FIG. 3 is a view showing the relation between the air fuel ratio of the exhaust gas flowing into the NOx catalyst 3 and the concentration of NOx flowing out from the NOx catalyst 3, in cases where the temperature of the NOx catalyst 3 is equal to or higher than the predetermined temperature. A solid line indicates a case where the equivalent ratio is set to 0.5, and a broken line indicates a case where the equivalent ratio is set to 2. In cases where the air fuel ratio of the exhaust gas is smaller than 20, the concentration of NOx in the exhaust gas flowing out from the NOx catalyst 3 is lower when the equivalent ratio is 2 than when the equivalent ratio is 0.5. That is, in the case where the equivalent ratio is 0.5, it is in a state where the amount of the additive agent is short or insufficient for the amount of NOx flowing into the NOx catalyst 3, so the NOx which can not be reduced by the NOx catalyst 3 flows out from the NOx catalyst 3. On the other hand, in the case where the equivalent ratio is 2, it is in a state where a sufficient amount of additive agent is supplied with respect to the amount of NOx flowing into the NOx catalyst 3, so the NOx is reduced in the NOx catalyst 3, and the amount of NOx flowing out of the NOx catalyst 3 becomes small. With air fuel ratios in this range, the oxygen concentration of the exhaust gas is low and the oxidation of ammonia is suppressed, so the amount of NOx produced by the oxidation of ammonia is small. Accordingly, in the air fuel ratios in this range, because a larger amount of NOx is reduced as the equivalent ratio is larger (i.e., as the amount of addition of the additive agent is larger), so the concentration of NOx in the exhaust gas at the downstream side of the NOx catalyst 3 becomes low.

On the other hand, in cases where the air fuel ratio of the exhaust gas is larger than 20, for example, the concentration of NOx in the exhaust gas flowing out from the NOx catalyst 3 becomes lower when the equivalent ratio is 0.5 than when the equivalent ratio is 2. In the case where the equivalent ratio is 0.5, it is in a state where the amount of the additive agent is short or insufficient for the amount of NOx flowing into the NOx catalyst 3, so the NOx flows out from the NOx catalyst 3. On the other hand, when the equivalent ratio is 2, the concentration of NOx in the exhaust gas flowing out from the NOx catalyst 3 is high, in spite of a sufficient amount of the additive agent being added. This is because ammonia is oxidized to produce NOx in the NOx catalyst 3. When the equivalent ratio is 0.5, the amount of ammonia supplied to the NOx catalyst 3 is small, so the amount of NOx produced by the oxidation of ammonia is also small, and an increase in the concentration of NOx in the exhaust gas is suppressed. Accordingly, in this embodiment, the above-mentioned predetermined air fuel ratio is set to 20, for example.

Figure 4:
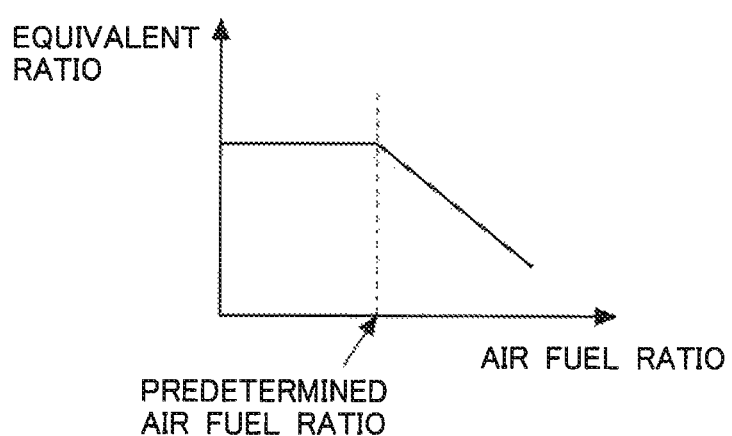
FIG. 4 is a view showing the relation between the air fuel ratio of the exhaust gas flowing into the NOx catalyst and an equivalent ratio set in the first embodiment, in cases where the temperature of the NOx catalyst is equal to or higher than the predetermined temperature.

FIG. 4 is a view showing the relation between the air fuel ratio of the exhaust gas flowing into the NOx catalyst 3 and the equivalent ratio set in the this embodiment, in cases where the temperature of the NOx catalyst 3 is equal to or higher than the predetermined temperature. Thus, in the case where the air fuel ratio of the exhaust gas is larger than the predetermined air fuel ratio, the equivalent ratio is made smaller than in the case where it is equal to or less than the predetermined air fuel ratio. Further, in the case where the air fuel ratio of the exhaust gas is larger than the predetermined air fuel ratio, too, the equivalent ratio is made smaller as the air fuel ratio of the exhaust gas is larger. In cases where the air fuel ratio of the exhaust gas is equal to or less than the predetermined air fuel ratio, the equivalent ratio may also be set to a fixed value. By setting the equivalent ratio to the fixed value, the amount of addition of the additive agent becomes a value proportional to the amount of NOx flowing into the NOx catalyst 3. In FIG. 4, the equivalent ratio set in the case where the air fuel ratio of the exhaust gas is larger than the predetermined air fuel ratio is set in such a manner that the amount of NOx flowing out from the NOx catalyst 3 becomes a minimum within a range where the amount of addition of the additive agent is permitted. The relation shown in FIG. 4 has been obtained in advance through experiments, simulations, or the like.

Figure 5:
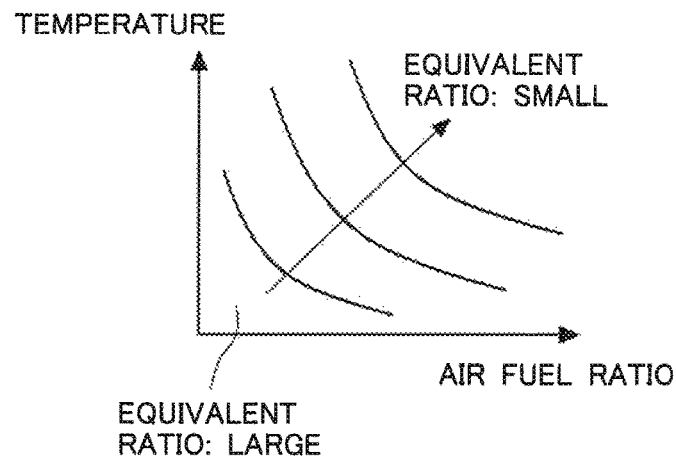
FIG. 5 is a view showing the relation between the air fuel ratio of the exhaust gas flowing into the NOx catalyst, the temperature of the NOx catalyst, and the equivalent ratio, in cases where the temperature of the NOx catalyst is equal to or higher than the predetermined temperature.

Here, note that the equivalent ratio may be set according to the relation shown in the following FIG. 5, in place of the relation shown in FIG. 4. FIG. 5 is a view showing the relation between the air fuel ratio of the exhaust gas flowing into the NOx catalyst 3, the temperature of the NOx catalyst 3, and the equivalent ratio, in cases where the temperature of the NOx catalyst 3 is equal to or higher than the predetermined temperature. In FIG. 5, equivalent ratio distributions are shown by equi-equivalent ratio lines, each of which is a line connecting points or locations having an equal equivalent ratio. In FIG. 5, an equivalent ratio in a region where the air fuel ratio is the smallest and where the temperature is the lowest is the largest. In cases where the temperature of the NOx catalyst 3 is the same, the larger the air fuel ratio of the exhaust gas, the more easily ammonia becomes oxidized, so the equivalent ratio is made smaller. In addition, in cases where the air fuel ratio of the exhaust gas is the same, the higher the temperature of the NOx catalyst 3, the more easily ammonia becomes oxidized, so the equivalent ratio is made smaller. The relation shown in FIG. 5 has been obtained in advance through experiments, simulations, or the like.

Figure 6:
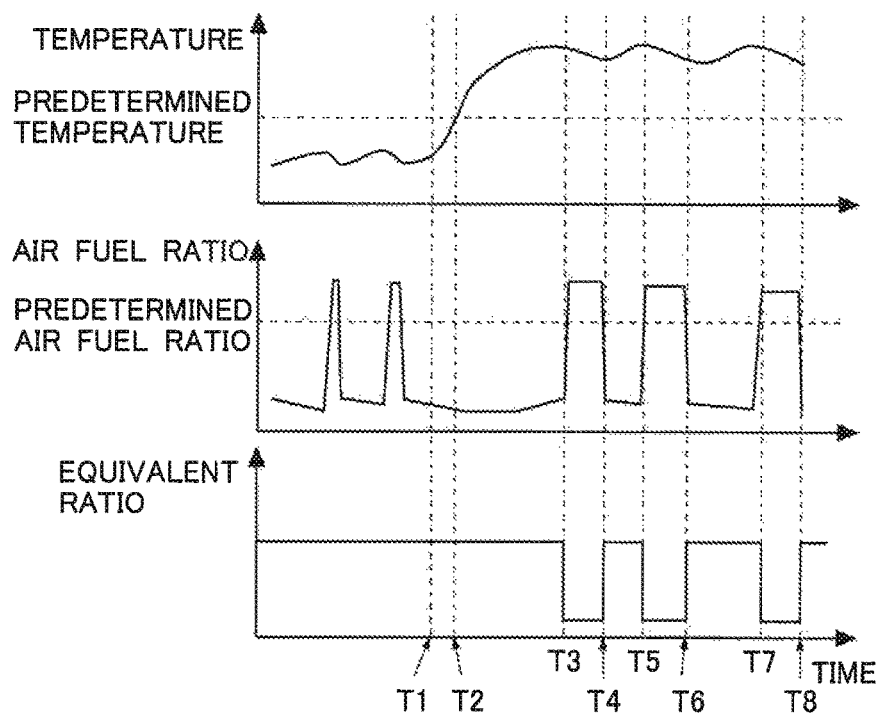
FIG. 6 is a time chart showing the changes over time of the temperature of the NOx catalyst, the air fuel ratio of the exhaust gas flowing into the NOx catalyst (this may be the air fuel ratio in a cylinder of the internal combustion engine), and the equivalent ratio, in cases where the temperature of the NOx catalyst is equal to or higher than the predetermined temperature.

Next, FIG. 6 is a time chart showing the changes over time of the temperature of the NOx catalyst 3, the air fuel ratio of the exhaust gas flowing into the NOx catalyst 3 (this may be the air fuel ratio in a cylinder of the internal combustion engine 1), and the equivalent ratio, in cases where the temperature of the NOx catalyst 3 is equal to or higher than the predetermined temperature. FIG. 6 is a view showing changes over time of various kinds of values in cases where the regeneration processing of the filter is carried out, for example.

T1 is a point in time at which the regeneration processing of the filter is started, and T2 is a point in time at which the temperature of the NOx catalyst 3 has reached the predetermined temperature. A period of time from T2 to T3, a period of time from T4 to T5, and a period of time from T6 to T7 are periods of time in which the air fuel ratio of the exhaust gas is equal to or less than the predetermined air fuel ratio. On the other hand, a period of time from T3 to T4, a period of time from T5 to T6, and a period of time from T7 to T8 are periods of time in which the air fuel ratio of the exhaust gas is larger than the predetermined air fuel ratio. When the regeneration processing of the filter is carried out, the internal combustion engine 1 is operated at an air fuel ratio larger than the predetermined air fuel ratio, and exhaust gas of high temperature is discharged from the internal combustion engine 1, whereby the temperature of the filter is raised. Even when this regeneration processing of the filter is being carried out, at the time of acceleration, etc., the internal combustion engine 1 may be operated at an air fuel ratio which is equal to or less than the predetermined air fuel ratio. Then, when the air fuel ratio of the exhaust gas becomes equal to or less than the predetermined air fuel ratio, the equivalent ratio is set to a value decided according to the amount of NOx flowing into the NOx catalyst 3. On the other hand, when the air fuel ratio of the exhaust gas is larger than the predetermined air fuel ratio, the oxygen concentration of the exhaust gas is high, so ammonia is apt to be oxidized. In such a case, the equivalent ratio is made smaller than when the air fuel ratio of the exhaust gas is equal to or less than the predetermined air fuel ratio. For this reason, in cases where the air fuel ratio of the exhaust gas is larger than the predetermined air fuel ratio, the amount of ammonia to be oxidized can be decreased. Accordingly, the amount of NOx flowing out from the NOx catalyst 3 can be decreased. Here, note that the amount of addition of the additive agent may be decreased until the equivalent ratio becomes zero, in the period of time from T3 to T4, in the period of time from T5 to T6, and in the period of time from T7 to T8.

Figure 7:
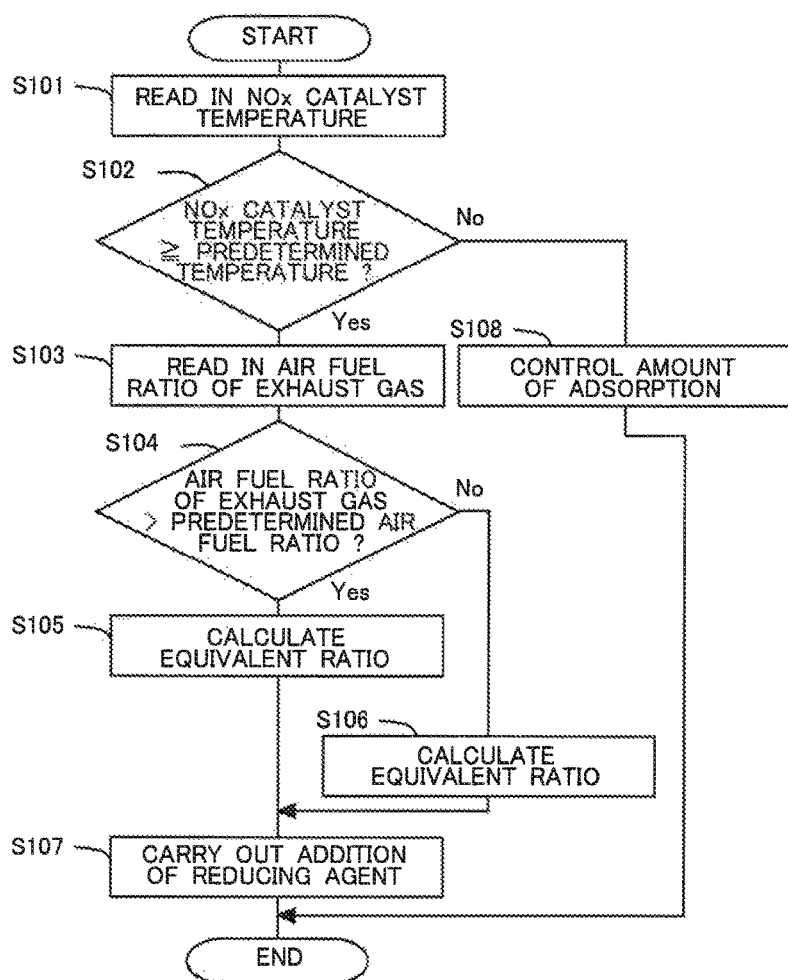
FIG. 7 is a flow chart showing a flow for addition control of an additive agent according to the first embodiment of the present disclosure.

FIG. 7 is a flow chart showing a flow or routine for addition control of the additive agent according to this embodiment of the present disclosure. The routine in this flow chart is carried out by means of the ECU 10 at each predetermined time interval. The flow chart shown in FIG. 7 shows a case in which in cases where the temperature of the NOx catalyst 3 is equal to or higher than the predetermined temperature, the equivalent ratio control is carried out in such a manner that when the air fuel ratio of the exhaust gas flowing into the NOx catalyst 3 is larger than the predetermined air fuel ratio, the amount of the additive agent to be added from the addition valve 4 becomes smaller as the air fuel ratio of the exhaust gas is larger.

In step S101, the temperature of the NOx catalyst 3 is read in. The temperature of the NOx catalyst 3 is detected by the temperature sensor 13. Here, note that it is also possible to detect the temperature of the NOx catalyst 3 based on the operating state of the internal combustion engine 1, without using the temperature sensor 13.

In step S102, it is determined whether the temperature of the NOx catalyst 3 read in step S101 is equal to or higher than the predetermined temperature. In this step S102, it is determined whether the equivalent ratio control is carried out. In cases where an affirmative determination is made in step S102, the routine goes to step S103 in order to carry out the equivalent ratio control. On the other hand, in cases where a negative determination is made in step S102, the routine goes to step S108, where the adsorption amount control is carried out. For the adsorption amount control, well-known technologies can be used, so the explanation thereof will be omitted. Here, note that in step S108, in place of the adsorption amount control, another control to add the additive agent without regard to the air fuel ratio of the exhaust gas may be carried out.

In step S103, the air fuel ratio of the exhaust gas flowing into the NOx catalyst 3 is read in. This air fuel ratio of the exhaust gas can be detected by the air fuel ratio sensor 12. The ECU 10 reads in a detected value of the air fuel ratio sensor 12.

In step S104, it is determined whether the air fuel ratio of the exhaust gas read in step S103 exceeds the predetermined air fuel ratio. In this step S104, it is determined whether ammonia is oxidized in the NOx catalyst 3. In cases where an affirmative determination is made in step S104, the routine goes to step S105, whereas in cases where a negative determination is made, the routine goes to step S106.

In step S105, the equivalent ratio is calculated based on the air fuel ratio of the exhaust gas read in step S103. The ECU 10 calculates the equivalent ratio according to the relation shown in FIG. 4 or FIG. 5. On the other hand, in step S106, too, the equivalent ratio may be calculated according to the relation shown in FIG. 4 or FIG. 5, but instead of this, a fixed value obtained in advance by experiments or simulations can be used as the equivalent ratio.

Then, in step S107, the additive agent is added from the addition valve 4 according to the equivalent ratio calculated in step S105 or step S106. For example, the ECU 10 calculates the amount of NOx flowing into the NOx catalyst 3 based on the concentration of NOx detected by the NOx sensor 11, and the flow rate of the exhaust gas. Here, note that the flow rate of the exhaust gas can be calculated, for example, by the amount of intake air detected by the air flow meter 23, and the amount of fuel injection from the fuel injection valve 6. Then, an amount of the additive agent able to reduce the NOx flowing into the NOx catalyst 3 without excess and deficiency is calculated based on the amount of NOx flowing into the NOx catalyst 3, and by multiplying this amount of the additive agent by the equivalent ratio, an amount of the additive agent which should be added from the addition valve 4 is obtained. Here, note that in this embodiment, the ECU 10, which carries out the processings of step S104, step S105 or step S106, and step S107 corresponds to a controller in the present disclosure.

Figure 8:
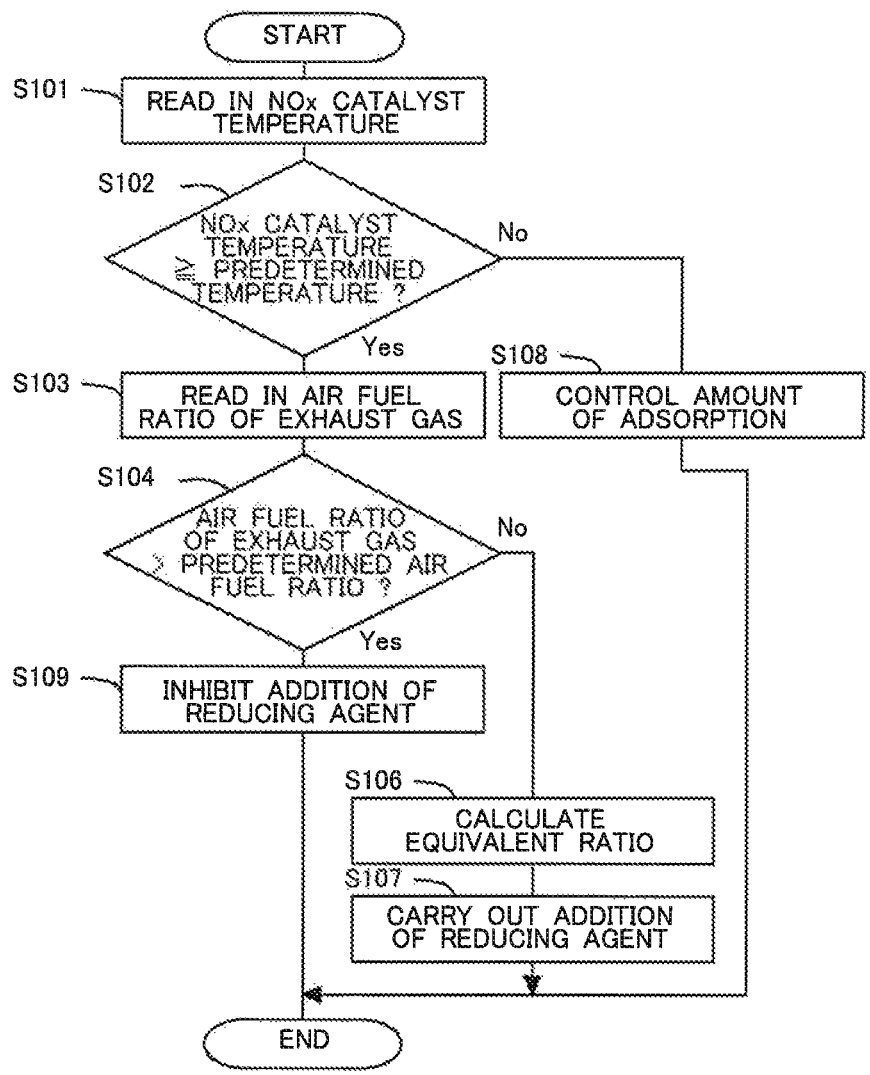
FIG. 8 is a flow chart showing another flow for addition control of the additive agent according to the first embodiment of the present disclosure.

In addition, FIG. 8 is a flow chart showing another flow or routine for addition control of the additive agent according to this embodiment of the present disclosure. The routine in this flow chart is carried out by means of the ECU 10 at each predetermined time interval. The flow chart shown in FIG. 8 shows a case in which in cases where the temperature of the NOx catalyst 3 is equal to or higher than the predetermined temperature, the equivalent ratio control is carried out in such a manner that when the air fuel ratio of the exhaust gas flowing into the NOx catalyst 3 is larger than the predetermined air fuel ratio, the additive agent is not added from the addition valve 4. For those steps in which the same processings as in FIG. 7 are carried out, the same reference numerals and characters are attached and the explanation thereof is omitted.

In the flow chart shown in FIG. 8, in cases where an affirmative determination is made in step S104, the routine goes to step S109. In step S109, the addition of the additive agent from the addition valve 4 is inhibited. That is, the amount of addition of the additive agent is decreased until it becomes 0. Thereafter, this flow or routine is ended. Here, note that instead of carrying out the flow chart shown in FIG. 8, the flow chart shown in FIG. 7 may be carried out, so that the equivalent ratio may be set to 0 in step S105.

As described above, even in cases where the air fuel ratio is large, it is possible to decrease the amount of ammonia oxidized at the time of the air fuel ratio being large, by decreasing the amount of the additive agent to be supplied. That is, the NOx produced by the oxidation of ammonia can be suppressed from flowing out of the NOx catalyst 3. In addition, in cases where the air fuel ratio is small, NOx can be sufficiently reduced by supplying the amount of additive agent according to the amount of NOx flowing into the NOx catalyst 3. From these, it is possible to decrease the amount of NOx flowing out of the NOx catalyst 3. That is, the NOx reduction rate as an entire system can be improved, by supplying an appropriate amount of additive agent to the NOx catalyst 3, while suppressing the production of NOx by ammonia being oxidized in the NOx catalyst 3.

Second Embodiment

Figure 9:
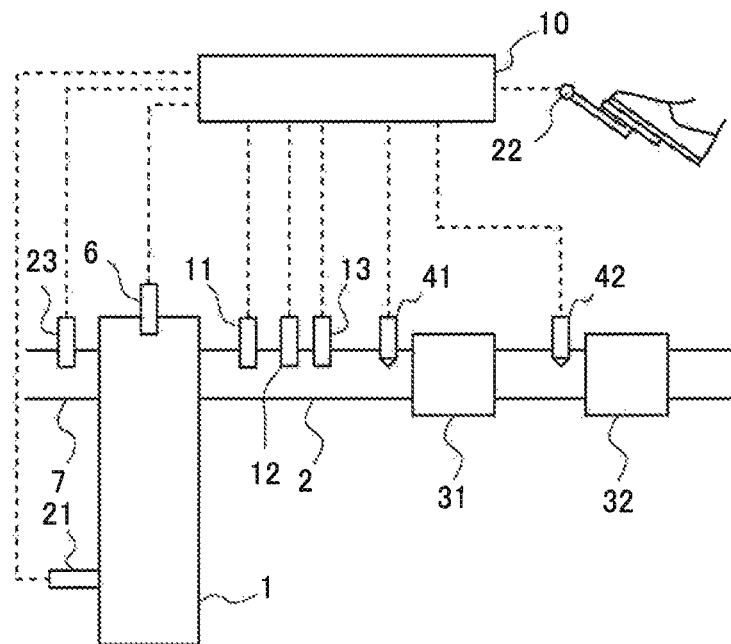
FIG. 9 is a view showing the schematic construction of an internal combustion engine and its exhaust system according to a second embodiment of the present disclosure.

FIG. 9 is a view showing the schematic construction of an internal combustion engine and its exhaust system according to a second embodiment of the present disclosure. In the following, a construction different from that shown in FIG. 1 will mainly be explained. In the construction shown in FIG. 9, two NOx selective catalytic reduction catalysts are arranged in an exhaust passage 2. An NOx catalyst at the upstream side is referred to as a first NOx catalyst 31, and an NOx catalyst at the downstream side is referred to as a second NOx catalyst 32.

A first addition valve 41 for adding an additive agent into exhaust gas is arranged in the exhaust passage 2 at the upstream side of the first NOx catalyst 31. Also, a second addition valve 42 for adding the additive agent into the exhaust gas is arranged in the exhaust passage 2 at the downstream side of the first NOx catalyst 31 and at the upstream side of the second NOx catalyst 32. The first addition valve 41 and the second addition valve 42 are connected to the ECU 10 through electrical wiring, so that the first addition valve 41 and the second addition valve 42 are controlled by the ECU 10.

Here, in order to quickly raise the temperature of an NOx catalyst at the time of cold start of the internal combustion engine 1, the NOx catalyst may be arranged in the exhaust passage 2 at a relatively upstream side thereof so that the NOx catalyst may be brought close to the internal combustion engine 1. Thus, by arranging the NOx catalyst in such a manner as to bring it close to the internal combustion engine 1, the temperature of the NOx catalyst becomes apt to rise with the heat possessed by the exhaust gas. However, there may not exist a sufficient space for arranging the NOx catalyst in the vicinity of the internal combustion engine 1. In addition, in order to reduce NOx to a sufficient extent, the NOx catalyst is required to have a certain amount of capacity. Accordingly, the second NOx catalyst may be arranged at a position away from the internal combustion engine 1.

Because the first NOx catalyst 31 according to this second embodiment is arranged at a position relatively close to the internal combustion engine 1, the temperature thereof is apt to be raised by the heat of the exhaust gas at the time of cold start of the internal combustion engine 1. However, at the time of the regeneration processing of the filter, at the time of sulfur poisoning recovery processing or at the time of high load operation, etc., the exhaust gas of high temperature flows into the first NOx catalyst 31, whereby the temperature of the first NOx catalyst 31 becomes too high, and adsorption of ammonia therein can become difficult. On the other hand, the second NOx catalyst 32 is arranged at a position relatively far away from the internal combustion engine 1, so even in cases where the temperature of the exhaust gas flowing into the first NOx catalyst 31 is high, the heat of the exhaust gas is taken by the first NOx catalyst 31 and the exhaust passage 2, as a consequence of which the temperature of the exhaust gas will drop by the time it reaches the second NOx catalyst 32. For that reason, a rise in the temperature of the second NOx catalyst 32 is suppressed. Accordingly, even when the temperature of the first NOx catalyst 31 becomes too high and the reduction of NOx is difficult, NOx may be able to be sufficiently reduced in the second NOx catalyst 32. In such a case, by supplying ammonia to the second NOx catalyst 32, NOx can be reduced in the second NOx catalyst 32 by using this ammonia.

In order to supply the additive agent to the second NOx catalyst 32, the additive agent may be added from the second addition valve 42, or the additive agent may be added from the first addition valve 41 in such a manner as to be caused to flow out from the first NOx catalyst 31. In cases where the additive agent is added from the first addition valve 41 in such a manner as to be caused to flow out from the first NOx catalyst 31, an amount of additive agent larger than an amount of additive agent which can be adsorbed in the first NOx catalyst 31 is added from the first addition valve 41. However, when the additive agent is supplied to the first NOx catalyst 31, ammonia may be oxidized to produce NOx in the first NOx catalyst 31 in cases where the temperature of the first NOx catalyst 31 is equal to or higher than the predetermined temperature.

Accordingly, in this second embodiment, in cases where the temperature of the first NOx catalyst 31 is equal to or higher than the predetermined temperature, a ratio of the amount of the additive agent to be added from the first addition valve 41 with respect to a total amount of the additive agents to be added from the first addition valve 41 and the second addition valve 42 (hereinafter, also referred to as an addition ratio of the first addition valve 41) is made smaller, when the air fuel ratio of the exhaust gas flowing into the first NOx catalyst 31 is larger than a predetermined air fuel ratio, than when it is equal to or less than the predetermined air fuel ratio. Here, note that in the following, a ratio of the amount of the additive agent to be added from the second addition valve 42 with respect to the total amount of the additive agents to be added from the first addition valve 41 and the second addition valve 42 is also referred to as an addition ratio of the second addition valve 42. The addition ratio of the first addition valve 41 is decreased in an amount, by which the addition ratio of the second addition valve 42 is increased. The predetermined air fuel ratio is the same as that explained in the first embodiment. In addition, in cases where the temperature of the first NOx catalyst 31 is equal to or higher than the predetermined temperature, when the air fuel ratio of the exhaust gas flowing into the first NOx catalyst 31 is larger than the predetermined air fuel ratio, the additive agent from the first addition valve 41 may not be added (i.e., the addition ratio of the first addition valve 41 may be decreased to 0).

Figure 10:
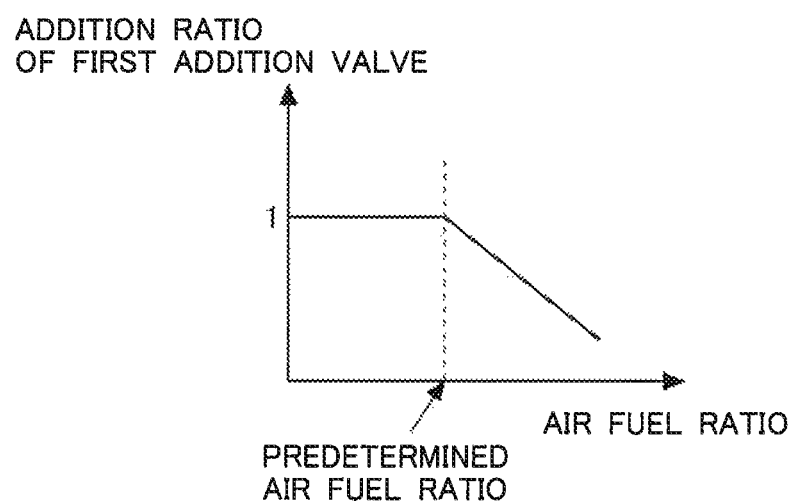
FIG. 10 is a view showing the relation between the air fuel ratio of exhaust gas flowing into a first NOx catalyst, and an addition ratio of a first addition valve, in cases where the temperature of the first NOx catalyst is equal to or higher than a predetermined temperature.

Here, FIG. 10 is a view showing the relation between the air fuel ratio of the exhaust gas flowing into the first NOx catalyst 31, and the addition ratio of the first addition valve 41, in cases where the temperature of the first NOx catalyst 31 is equal to or higher than the predetermined temperature. Thus, in cases where the air fuel ratio of the exhaust gas is equal to or less than the predetermined air fuel ratio, the addition ratio of the first addition valve 41 is set to 1. That is, the additive agent is supplied to the second NOx catalyst 32 by adding the additive agent from the first addition valve 41, without adding the additive agent from the second addition valve 42. At this time, the equivalent ratio is set such that the additive agent can flow out from the first NOx catalyst 31, and can be supplied to the second NOx catalyst 32. Here, note that the amount of additive agent flowing out from the first NOx catalyst 31 is decided according to the temperature of the first NOx catalyst 31, the amount of NOx flowing into the first NOx catalyst 31, the air fuel ratio of the exhaust gas flowing into the first NOx catalyst 31, and the flow rate of the exhaust gas. Accordingly, the amount of additive agent caused to flow out of the first NOx catalyst 31 may be calculated according to the amount of adsorption of ammonia in the second NOx catalyst 32, and the amount of addition of the additive agent from the first addition valve 41 may be calculated such as to attain the amount of additive agent caused to flow out from the first NOx catalyst 31 thus calculated.

On the other hand, in cases where the temperature of the first NOx catalyst 31 is equal to or higher than the predetermined temperature, and in cases where the air fuel ratio of the exhaust gas flowing into the first NOx catalyst 31 is larger than the predetermined air fuel ratio, ammonia will be more easily oxidized in the first NOx catalyst 31 as the air fuel ratio of the exhaust gas becomes larger. For this reason, the larger the air fuel ratio of the exhaust gas, the smaller the addition ratio of the first addition valve 41 is made, in order that the larger the air fuel ratio of the exhaust gas, the smaller the amount of the additive agent supplied to the first NOx catalyst 31 may become. That is, by making larger the addition ratio of the second addition valve 42, the amount of the additive agent supplied to the second NOx catalyst 32 can be increased, while decreasing the amount of ammonia oxidized in the first NOx catalyst 31. In FIG. 10, the addition ratio of the first addition valve 41 set in the case where the air fuel ratio of the exhaust gas is larger than the predetermined air fuel ratio may be set, for example, such that the amount of NOx flowing out from the first NOx catalyst 31 becomes a minimum within a range where the amount of addition of the additive agent is permitted. The relation shown in FIG. 10 has been obtained in advance through experiments, simulations, or the like.

Figure 11:
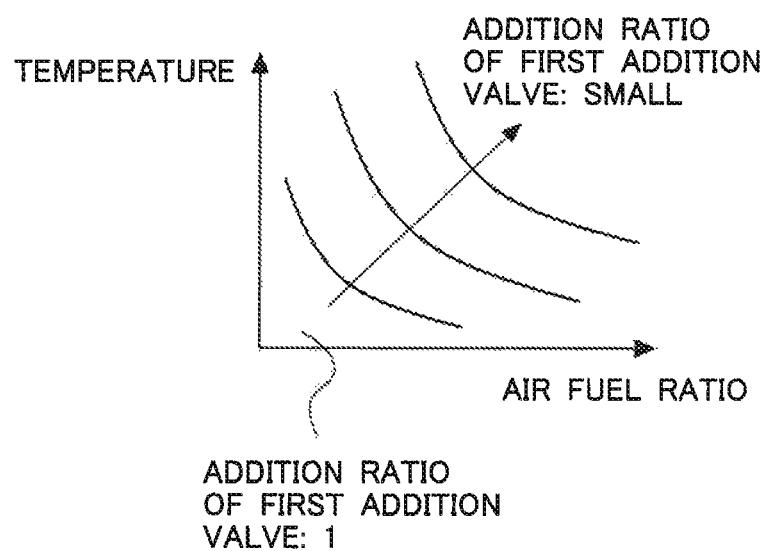
FIG. 11 is a view showing the relation between the air fuel ratio of exhaust gas flowing into the first NOx catalyst, the temperature of the first NOx catalyst, and the addition ratio of the first addition valve, in cases where the temperature of the first NOx catalyst is equal to or higher than the predetermined temperature.

In addition, the equivalent ratio may be set according to the relation shown in the following FIG. 11, in place of the relation shown in FIG. 10. FIG. 11 is a view showing the relation between the air fuel ratio of the exhaust gas flowing into the first NOx catalyst 31, the temperature of the first NOx catalyst 31, and the addition ratio of the first addition valve 41, in cases where the temperature of the first NOx catalyst 31 is equal to or higher than the predetermined temperature. In FIG. 11, the distributions of the addition ratio of the first addition valve 41 are shown by equal addition ratio lines, each of which is a line connecting points or locations having an equal addition ratio of the first addition valve 41. In FIG. 11, the addition ratio of the first addition valve 41, in a region where the air fuel ratio is the smallest and where the temperature is the lowest, is the largest, and the addition ratio of the first addition valve 41 at this time is 1, for example. In cases where the temperature of the first NOx catalyst 31 is the same, the larger the air fuel ratio of the exhaust gas, the smaller the addition ratio of the first addition valve 41 is made. In addition, in cases where the air fuel ratio of the exhaust gas is the same, the higher the temperature of the first NOx catalyst 31, the smaller the addition ratio of the first addition valve 41 is made. The relation shown in FIG. 11 has been obtained in advance through experiments, simulations, or the like.

Figure 12:
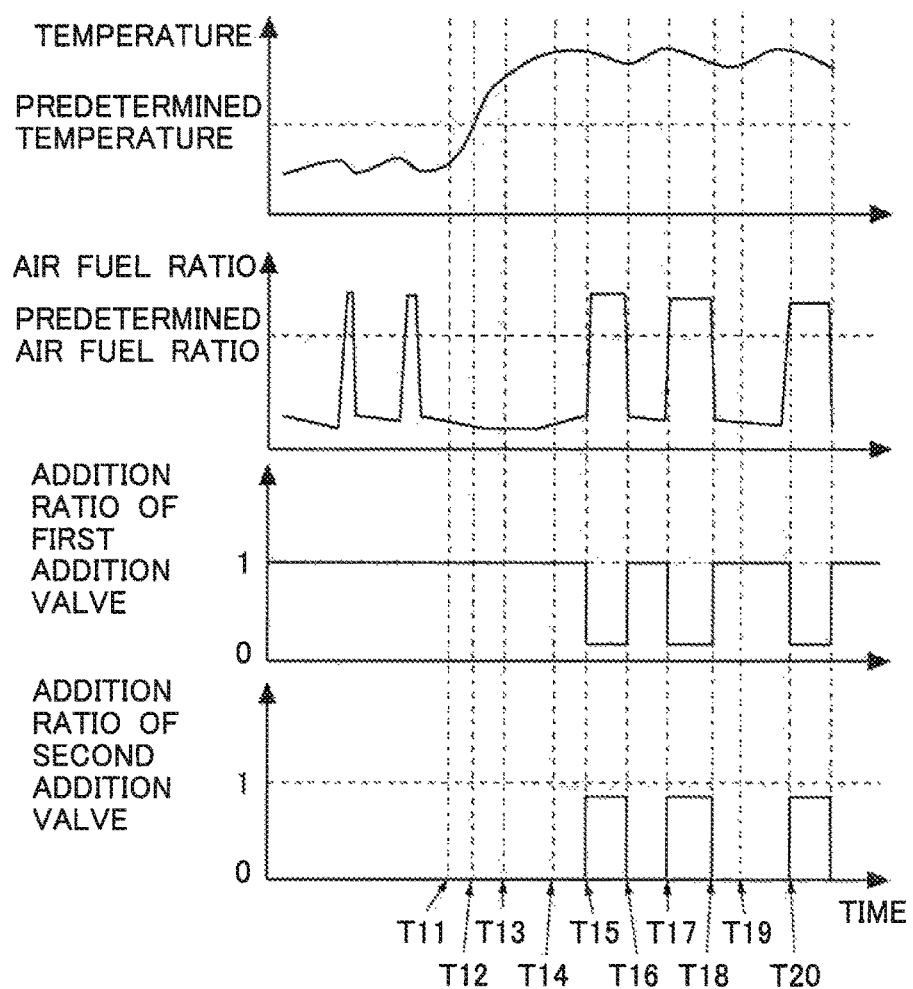
FIG. 12 is a time chart showing the changes over time of the temperature of the first NOx catalyst, the air fuel ratio of the exhaust gas flowing into the first NOx catalyst (this may be the air fuel ratio in a cylinder of the internal combustion engine), the addition ratio of the first addition valve and the addition ratio of the second addition valve, in cases where the temperature of the first NOx catalyst is equal to or higher than the predetermined temperature.

Moreover, FIG. 12 is a time chart showing the changes over time of the temperature of the first NOx catalyst 31, the air fuel ratio of the exhaust gas flowing into the first NOx catalyst 31 (this may be the air fuel ratio in a cylinder of the internal combustion engine 1), the addition ratio of the first addition valve 41 and the addition ratio of the second addition valve 42, in cases where the temperature of the first NOx catalyst 31 is equal to or higher than the predetermined temperature. FIG. 12 is a view showing changes over time of various kinds of values in cases where the filter regeneration processing is carried out, for example.

T11 is a point in time at which the regeneration processing of the filter is started, and T12 is a point in time at which the temperature of the first NOx catalyst 31 has reached the predetermined temperature. A period of time from T12 to T15, a period of time from T16 to T17, and a period of time from T18 to T20 are periods of time in which the air fuel ratio of the exhaust gas is equal to or less than the predetermined air fuel ratio. On the other hand, a period of time from T15 to T16, a period of time from T17 to T18, and a period of time from T20 to T21 are periods of time in which the air fuel ratio of the exhaust gas is larger than the predetermined air fuel ratio. As shown in FIG. 12, in cases where the temperature of the first NOx catalyst 31 is equal to or higher than the predetermined temperature, the addition ratio of the first addition valve 41 is made smaller, when the air fuel ratio of the exhaust gas flowing into the first NOx catalyst 31 is larger than the predetermined air fuel ratio, than when it is equal to or less than the predetermined air fuel ratio. Here, note that in the periods of time in which the air fuel ratio of the exhaust gas is larger than the predetermined air fuel ratio, the amount of addition of the additive agent is made to decrease until the addition ratio of the first addition valve 41 becomes 0, and the amount of addition of the additive agent is made to increase until the addition ratio of the second addition valve 42 becomes 1. In addition, in the periods of time in which the air fuel ratio of the exhaust gas is smaller than the predetermined air fuel ratio, the addition ratio of the first addition valve 41 is set to 1, but instead of this, the addition ratio of the first addition valve 41 may be set to a value which is smaller than 1 and larger than 0. In this second embodiment, the addition ratio of the first addition valve 41 should just become smaller, when the air fuel ratio of the exhaust gas is larger than the predetermined air fuel ratio, than when the air fuel ratio of the exhaust gas is equal to or less than the predetermined air fuel ratio.

Figure 13:
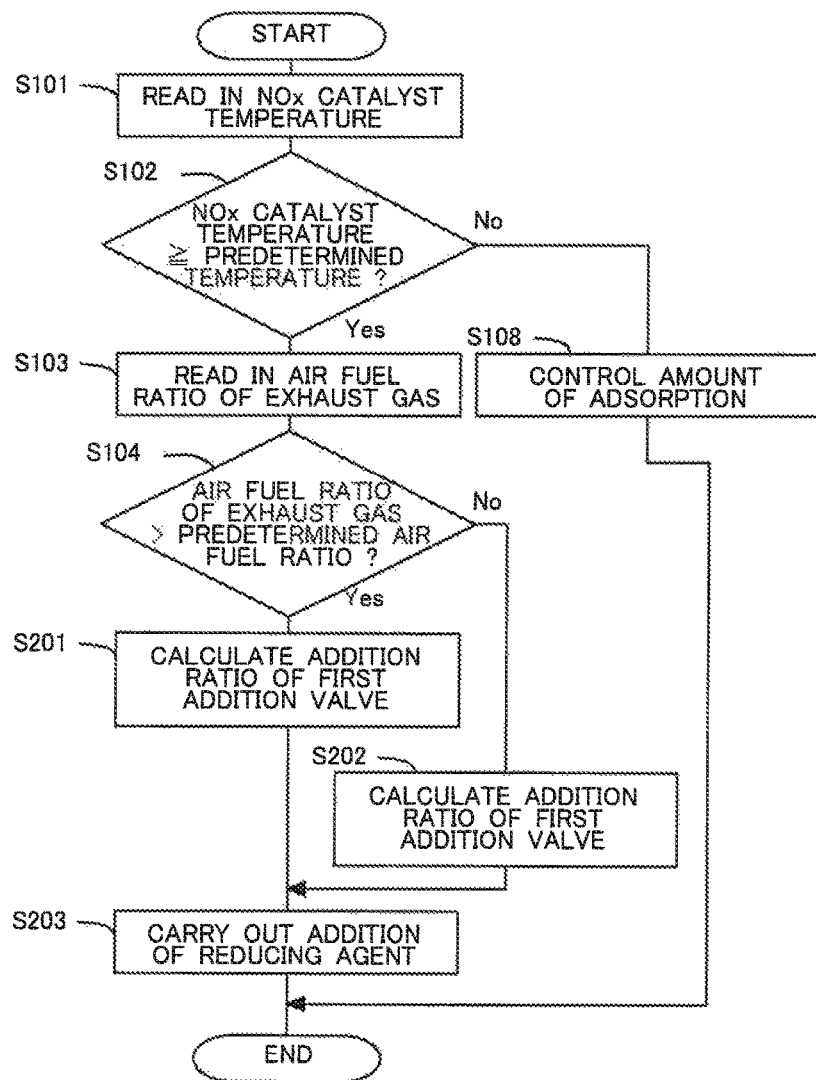
FIG. 13 is a flow chart showing a flow for addition control of an additive agent according to the second embodiment of the present disclosure.

FIG. 13 is a flow chart showing a flow or routine for addition control of the additive agent according to this second embodiment of the present disclosure. The routine in this flow chart is carried out by means of the ECU 10 at each predetermined time interval. Here, note that for those steps in which the same processings as in the aforementioned flow charts are carried out, the same reference numerals and characters are attached and the explanation thereof is omitted.

In the flow chart shown in FIG. 13, in cases where an affirmative determination is made in step S104, the routine goes to step S201. In step S201, the addition ratio of the first addition valve 41 is calculated based on the air fuel ratio of the exhaust gas flowing into the first NOx catalyst 31. In this case, for example, the addition ratio of the first addition valve 41 is calculated according to the relation shown in FIG. 10 or FIG. 11.

On the other hand, in the flow chart shown in FIG. 13, when a negative determination is made in step S104, the routine goes to step S202. In step S202, the addition ratio of the first addition valve 41 is calculated not based on the air fuel ratio of the exhaust gas flowing into the first NOx catalyst 31. In this case, the addition ratio of the first addition valve 41 may be set to 1, as shown in FIG. 10. In addition, the ease of oxidation of ammonia changes according to the temperature of the first NOx catalyst 31, so the addition ratio of the first addition valve 41 may be calculated based on the temperature of the first NOx catalyst 31. This relation has been obtained in advance through experiments, simulations, or the like.

After the processing of step S201 or step S202 is completed, the routine goes to step S203. In step S203, the additive agent is added so as to provide the addition ratio of the first addition valve 41 calculated in step S201 or step S202. At this time, a total amount of the additive agents to be added from the first addition valve 41 and the second addition valve 42 is decided based on the amount of NOx flowing into the first NOx catalyst 31. For example, the total amount of the additive agents may be decided so that the equivalent ratio becomes a predetermined equivalent ratio. The predetermined equivalent ratio has been obtained in advance through experiments, simulations or the like. Here, note that in this second embodiment, the ECU 10, which carries out the processings of step S104, step S201 or step S202, and step S203 corresponds to a controller in the present disclosure.

Figure 14:
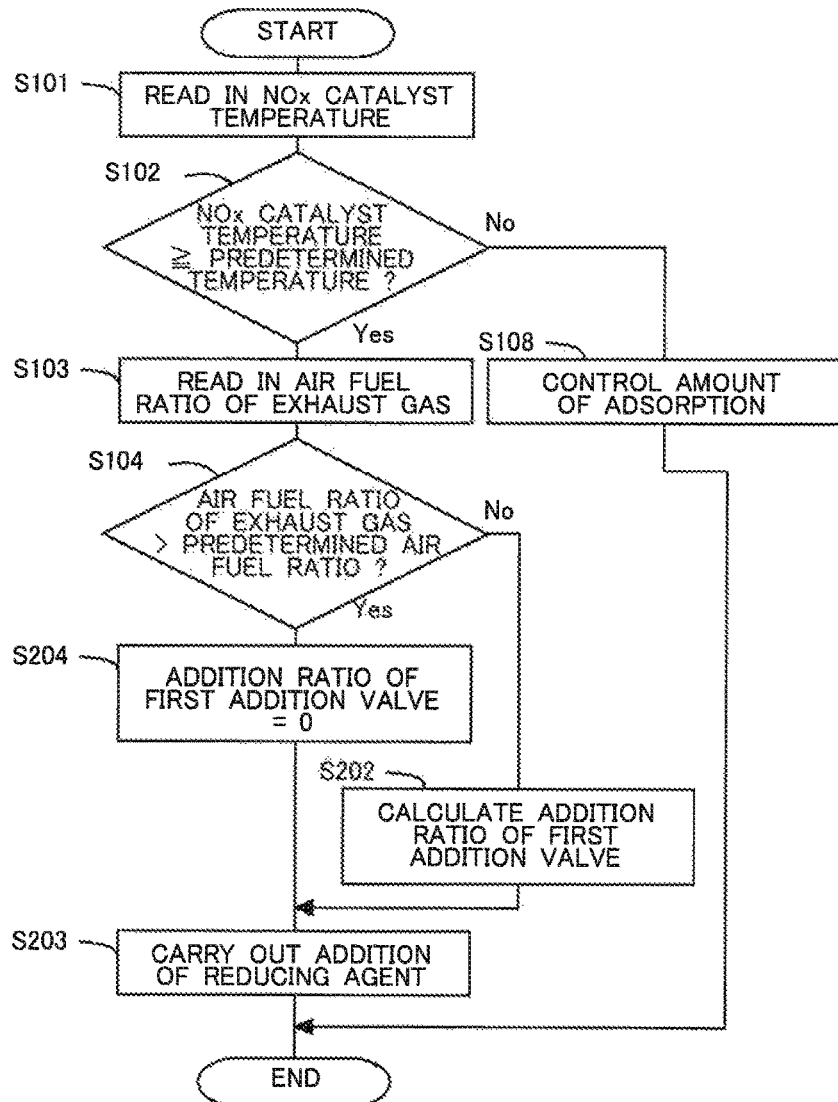
FIG. 14 is a flow chart showing another flow for addition control of the additive agent according to the second embodiment of the present disclosure.

Further, FIG. 14 is a flow chart showing another flow or routine for addition control of the additive agent according to this second embodiment of the present disclosure. The routine in this flow chart is carried out by means of the ECU 10 at each predetermined time interval. The flow chart shown in FIG. 14 shows a case in which in cases where the temperature of the NOx catalyst 3 is equal to or higher than the predetermined temperature, when the air fuel ratio of the exhaust gas flowing into the NOx catalyst 3 is larger than the predetermined air fuel ratio, the addition ratio of the first addition valve 41 is made to 0. For those steps in which the same processings as in the aforementioned flow charts are carried out, the same reference numerals and characters are attached and the explanation thereof is omitted.

In the flow chart shown in FIG. 14, in cases where an affirmative determination is made in step S104, the routine goes to step S204. In step S204, the addition ratio of the first addition valve 41 is set to 0. Thereafter, the routine goes to step S203. Here, note that instead of carrying out the flow chart shown in FIG. 14, the flow chart shown in FIG. 13 may be carried out, so that the addition ratio of the first addition valve 41 may also be set to 0 in step S201.

Figure 15:
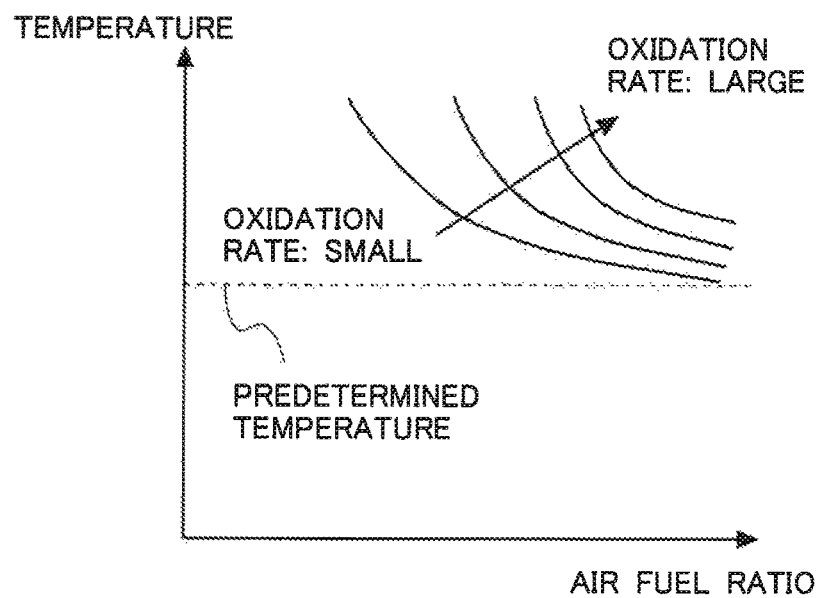
FIG. 15 is a view showing the relation between the air fuel ratio of the exhaust gas flowing into the first NOx catalyst, the temperature of the first NOx catalyst, and the rate of oxidation of ammonia in the first NOx catalyst.

Here, FIG. 15 is a view showing the relation between the air fuel ratio of the exhaust gas flowing into the first NOx catalyst 31, the temperature of the first NOx catalyst 31, and the rate of oxidation of ammonia in the first NOx catalyst 31. In FIG. 14, equi-oxidation rate distributions are shown by equi-oxidation rate lines, each of which is a line connecting points or locations having an equal oxidation rate. The rate of oxidation increases rapidly when the temperature of the first NOx catalyst 31 is equal to or higher than the predetermined temperature. Then, the higher the temperature of the first NOx catalyst 31, the larger the rate of oxidation becomes. In addition, when the air fuel ratio of the exhaust gas becomes large to some extent, the rate of oxidation becomes larger as the air fuel ratio of the exhaust gas is larger. For that reason, in the past, for example, in cases where the temperature of the first NOx catalyst 31 became equal to or higher than the predetermined temperature, an addition valve for supplying an additive agent had been changed from the first addition valve 41 to the second addition valve 42. That is, the addition ratio of the first addition valve 41 had been changed based on the temperature of the first NOx catalyst 31, without regard to the air fuel ratio.

However, when the air fuel ratio of the exhaust gas is small, the oxidation of ammonia is suppressed, even though the temperature of the first NOx catalyst 31 is equal to or higher than the predetermined temperature. Accordingly, in the past, even in the case of such an air fuel ratio at which the oxidation of ammonia was suppressed, the addition valve for supplying the additive agent was changed from the first addition valve 41 to the second addition valve 42. For that reason, even when NOx was able to be reduced by the first NOx catalyst 31, the additive agent was not supplied to the first NOx catalyst 31, and NOx was not able to be reduced.

On the other hand, in this second embodiment, in cases where the air fuel ratio of the exhaust gas is equal to or less than the predetermined air fuel ratio even though the temperature of the first NOx catalyst 31 is equal to or higher than the predetermined temperature, the additive agent is added from the first addition valve 41. With this, it becomes possible to reduce NOx in the first NOx catalyst 31, too. In addition, in cases where the temperature of the first NOx catalyst 31 is equal to or higher than the predetermined temperature, and in cases where the air fuel ratio of the exhaust gas flowing into the first NOx catalyst 31 is larger than the predetermined air fuel ratio, the oxidation of ammonia in the first NOx catalyst 31 can be suppressed by relatively decreasing the amount of addition of the additive agent from the first addition valve 41. In this case, by making the addition ratio of the first addition valve 41 smaller as the air fuel ratio of the exhaust gas becomes larger, it is possible to suppress the amount of supply of the additive agent to the first NOx catalyst 31 from becoming smaller than necessary. As a result of this, it becomes possible to suitably reduce or remove NOx in the first NOx catalyst 31, too. From the above, the NOx reduction rate of the system as a whole can be enhanced.

The invention claimed is:

1. An exhaust gas purification apparatus for an internal combustion engine comprising:
   an NOx selective catalytic reduction catalyst that is arranged in an exhaust passage of the internal combustion engine and selectively reduces NOx in an exhaust gas by using ammonia as a reducing agent;
   an addition valve that is arranged in said exhaust passage at the upstream side of said NOx selective catalytic reduction catalyst and adds an additive agent, which is ammonia or a precursor of ammonia, into the exhaust gas;
   a temperature sensor configured to acquire a temperature of said NOx selective catalytic reduction catalyst;
   an air fuel ratio sensor configured to acquire an air fuel ratio of the exhaust gas flowing into said NOx selective catalytic reduction catalyst; and
   a controller configured to make an amount of the additive agent to be added into the exhaust gas from said addition valve smaller when the air fuel ratio acquired by said air fuel ratio sensor is larger than a predetermined air fuel ratio, than when it is equal to or less than said predetermined air fuel ratio, in cases where the temperature acquired by said temperature sensor is equal to or higher than a predetermined temperature at which ammonia is oxidized.

2. The exhaust gas purification apparatus for an internal combustion engine as set forth in claim 1, wherein
   said NOx selective catalytic reduction catalyst is configured by including a first NOx catalyst and a second NOx catalyst that is arranged in said exhaust passage at the downstream side of said first NOx catalyst;
   said temperature sensor is configured so as to acquire the temperature of said first NOx catalyst;
   said air fuel ratio sensor is configured to acquire the air fuel ratio of the exhaust gas flowing into said first NOx catalyst;
   said addition valve is configured as a first addition valve that is arranged in said exhaust passage at the upstream side of said first NOx catalyst;
   provision is further made for a second addition valve that is arranged in said exhaust passage at the downstream side of said first NOx catalyst and at the upstream side of said second NOx catalyst, and adds the additive agent into the exhaust gas; and
   in the case where the temperature of said first NOx catalyst acquired by said temperature sensor is equal to or higher than said predetermined temperature, said controller is configured to make a ratio of an amount of the additive agent to be added from said first addition valve with respect to a total amount of the additive agents to be added from said first addition valve and said second addition valve smaller when the air fuel ratio acquired by said air fuel ratio sensor is larger than said predetermined air fuel ratio than when the air fuel ratio acquired by said air fuel ratio sensor is equal to or less than said predetermined air fuel ratio.

* * * * *